(12) United States Patent
Kirschner

(10) Patent No.: US 7,806,375 B1
(45) Date of Patent: Oct. 5, 2010

(54) RETAINING KEY

(75) Inventor: Kraig A. Kirschner, Corona, CA (US)

(73) Assignee: Automatic Fire Control, Incorporated, South El Monte, CA (US)

( * ) Notice: Subject to any disclaimer, the term of this patent is extended or adjusted under 35 U.S.C. 154(b) by 288 days.

(21) Appl. No.: 12/027,150

(22) Filed: Feb. 6, 2008

(51) Int. Cl.
 *F16L 3/24* (2006.01)
(52) U.S. Cl. .................. 248/72; 248/55; 248/228.6; 248/230.6; 248/231.71; 269/143; 269/249
(58) Field of Classification Search ............ 248/55, 248/72, 228.6, 230.6, 231.7; 269/143, 249
See application file for complete search history.

(56) References Cited

U.S. PATENT DOCUMENTS

| | | | | | |
|---|---|---|---|---|---|
| 1,343,930 | A | * | 6/1920 | Neely | 248/72 |
| 1,474,119 | A | * | 11/1923 | Robertson | 269/249 |
| 1,479,470 | A | * | 1/1924 | George | 138/113 |
| 1,619,591 | A | * | 3/1927 | Voellmecke | 248/72 |
| 2,470,439 | A | * | 5/1949 | Kohler | 248/643 |
| 3,301,513 | A | * | 1/1967 | Sugaya | 248/72 |
| 3,341,909 | A | * | 9/1967 | Havener | 24/486 |
| 4,146,138 | A | * | 3/1979 | Davis | 211/119.004 |
| 4,666,116 | A | * | 5/1987 | Lloyd | 248/228.6 |
| 5,127,577 | A | * | 7/1992 | Lynch et al. | 238/378 |
| 5,352,078 | A | * | 10/1994 | Nasu | 411/337 |
| 5,897,088 | A | * | 4/1999 | Kirschner | 248/300 |
| 5,947,424 | A | * | 9/1999 | Heath | 248/58 |
| 7,431,252 | B2 | * | 10/2008 | Birli et al. | 248/221.11 |

OTHER PUBLICATIONS

AFCON Flyer #160 Restraining Strap Nov. 2004.

* cited by examiner

*Primary Examiner*—Anita M King
*Assistant Examiner*—Michael McDuffie
(74) *Attorney, Agent, or Firm*—Connolly Bove Lodge & Hutz LLP

(57) ABSTRACT

A clamp assembly including a C-type clamp having an anvil, an opposed screw and a body therebetween is employed in securing a load to a flange of a structural beam. A plate includes a first portion having a locking texture on each side and a second portion offset from the first portion and having a mounting hole therethrough. The mounting hole receives the body of the C-type clamp with a clearance fit and with the locking texture in juxtaposition with the anvil of the C-type clamp. This plate provides a retaining key of hard steel to engage the anvil of the C-type clamp and the flange of a beam structure to enhance retention of the C-type clamp on the beam flange.

11 Claims, 1 Drawing Sheet

RETAINING KEY

BACKGROUND OF THE INVENTION

The field of the present invention is hanger hardware for use in building structures for utility piping.

Utility piping in building structures such as water pipes, gas lines, fire sprinkler pipes, conduits and the like are commonly supported on structural I-beams supporting the floors and roofs of buildings. A hanger commonly employed with such structural I-beams is a C-type clamp for gripping the flange of the I-beam with a depending threaded rod. Various pipe clamps and the like can be hung from the threaded rod to support the pipe or conduit. Because of expansion, contraction and vibration, it is desirable to provide additional securement of the C-type clamp of the I-beam to prevent the C-type clamp from working loose. Such additional securement has been provided by metal retaining straps, frequently required by applicable building codes.

FIGS. 1 through 3 illustrate one such metal restraining strap and its employment in association with an I-beam clamp. The illustrated strap 10 is disclosed in U.S. Pat. No. 5,897,088, the disclosure of which is incorporated herein by reference. The strap 10 engages a rod 12 in the application illustrated in FIG. 2. The strap 10 further engages an I-beam 14 by being bent about the flange 16 thereof. In the application of FIG. 3, the strap 10 engages a C-type clamp 18 rather than the rod 12.

SUMMARY OF THE INVENTION

The present invention is directed to a retaining key enhancing the retention of a C-type clamp hanger and separately the clamp assembly with employment of the retaining key. C-type clamp hangers conventionally include an anvil, an opposed screw and a body therebetween which are clamped upon an I-beam. The retaining key includes a plate with the first portion having a locking texture and a second portion, offset from the first portion, having a mounting hole to receive the body of the C-type clamp. The portion including the locking texture is aligned with the anvil. The retaining key optionally contemplates a variety of locking textures and possible association with the C-type clamp allowing relative movement between the clamp and the retaining key through clearance about the mounting hole.

With the retaining key structurally separate from the C-type clamp hanger, various dynamic forces on the C-type clamp are either not transmitted directly to the retaining key or are experienced only through the locking surface. As a result, the retaining key has an ability to retain position with engagement of both the supporting structure and the C-type clamp in spite of such forces, isolated or repetitive, which might otherwise dislodge the C-type clamp.

The employment of hangers with structural beams to support utility piping and conduits is often, if not regularly, in an environment where access is limited. More frequently than not, installations are made over the head of the installer. The retaining key facilitates installation in these circumstances as the key is associated with the clamp mechanisms and remains in assembly during installation of the clamp. As the retaining key also remains visible from the back of the clamp with the clamp in place, inspectors can insure that the key is properly placed without difficulty. Additionally, the retaining key is independent of beam size, with the advantage of one size fits all.

Accordingly, it is a principal object of the present invention to provide improved hanger retention on building structures. Other and further objects and advantages will appear hereinafter.

DETAILED DESCRIPTION OF THE PREFERRED EMBODIMENTS

Figure 5:
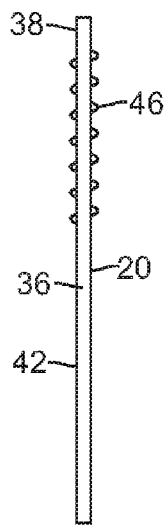
FIG. 5 is a side view of a retaining key with teeth.
Figure 6:
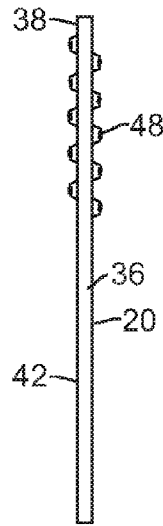
FIG. 6 is a side view of a retaining key with stipple.
Figure 7:
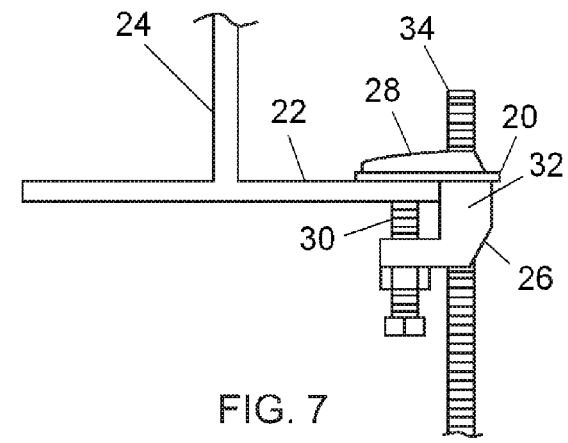
FIG. 7 is a side view of a retaining key with an I-beam and a C-type clamp.

Turning in detail to FIGS. 4 through 7, a retaining key 20 is disclosed with various locking textures. This retaining key 20 is to be employed in association with a clamp assembly being secured to a flange 22 on a beam 24. The beam 24 illustrated in FIG. 7 is an I-beam. Other structural flanges 22 associated with other structural beams may be employed. Further, the retaining key 20 is employed with a C-type clamp 26. The C-type clamp 26 is conventional, employing an anvil 28 and an opposed screw 30 with a body 32 between the anvil 28 and the opposed screw 30. These elements provide a C-shape element giving the clamp 26 its name. The body 32 includes a threaded hole therethrough to receive a threaded rod 34. Once assembled, the C-type clamp 26, the beam 24 and the threaded rod 34 provide a clamp assembly to which various pipe clamps and the like can be secured through engagement with the threaded rod 34.

Figure 1:
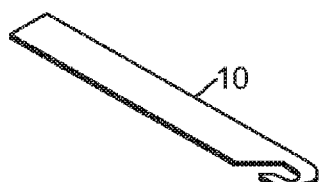
FIG. 1 is a perspective view of a metal restraining strap of the prior art.
Figure 2:
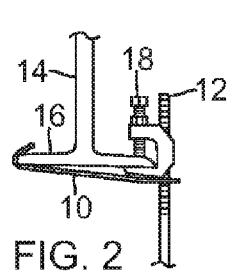
FIG. 2 is a side view of a first application of the metal restraining strap of FIG. 1 with an I-beam and a C-type clamp.
Figure 3:
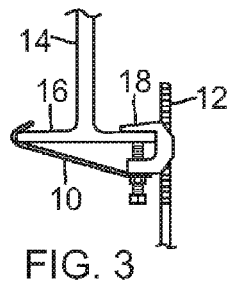
FIG. 3 is a side view of a second application of the metal restraining strap of FIG. 1 with an I-beam and a C-type clamp.
Figure 4:
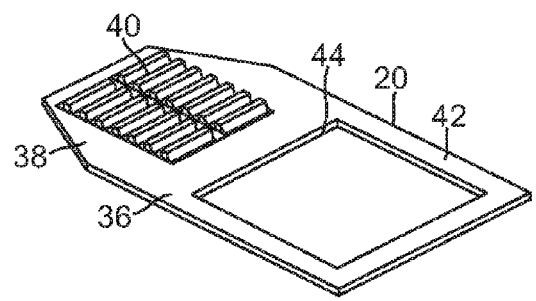
FIG. 4 is a perspective view of a retaining key with ribs.

The retaining key 20 includes a body defined by a plate 36. This plate 36 includes a first portion 38 having a locking texture 40. The locking texture 40 illustrated in FIG. 4 is defined by ribs punched into the plate 36. Each rib of the locking texture 40 is attached at each end to the surrounding plate 36 with the ribs rotated to extend in either direction from the plane of the plate 36.

The plate 36 further includes a second portion 42 which is offset from the first portion 38 and has a mounting hole 44 therethrough. The mounting hole 44 is shown in the embodiment of FIG. 4 to be rectangular. This hole 44 may take on any convenient plan which will allow it to receive the C-type clamp 26 as illustrated in FIG. 7. Preferably the mounting hole 44 provides a clearance fit about the body 32 of the C-type clamp 26. This facilitates placement of the plate 36 and can enable some relative movement in the plane of the plate 36 between the plate 36 and the C-type clamp 26.

FIG. 5 illustrates a plate 36 with teeth 46 on either side of the plate 36. The teeth 46 are formed in the plate 36 on either side thereof. These teeth 46 run laterally across the center portion of the plate 36. In FIG. 6, stipple, or ragged holes punched partway through the plate 36, are employed to define the locking texture 40 of the first portion 38. Otherwise, FIGS. 4, 5 and 6 illustrate embodiments which are the same.

In cooperating with the C-type clamp 26 and the beam 24, the plate 36 is preferably of spring steel. This enables the locking texture 40 to physically engage the softer flange 22 and anvil 28. Further, the locking texture 40 is aligned with the anvil 28 of the C-type clamp 26 when the mounting hole 44 is received by the body 32 of the C-type clamp 26.

In operation, the plate 36 is first assembled with the C-type clamp 26 by threading the anvil 28 and body 32 of the C-type clamp 26 through the mounting hole 44. The threaded rod 34 must not extend through the body 32 of the C-type clamp 26 to the point of interfering with the passage of the mounting hole 44 into position during assembly. The C-type clamp 26 is then positioned on the flange 22 of the beam 24 with the plate 36 between the flange 22 and the anvil 28. The screw 30 is then tightened to engage the flange 22. Preferably the locking texture 40 is fully aligned with the anvil 28 and the mounting hole 44 is arranged to have clearance about the body 32 of the C-type clamp 26. The opposed screw 30 is then tightened toward the anvil 28 to cause the locking texture 40 to engage and bite into the softer metal of the flange 22 and the anvil 28. Once the opposed screw 30 is appropriately tightened, the threaded rod 34 is appropriately arranged and one of various pipe clamps or other hardware mechanisms are associated with the threaded rod 34 to suspend sprinkler systems, plumbing, conduits and the like.

Thus, an improved restraining mechanism for a C-type plant is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A clamp assembly comprising
   a C-type clamp having an anvil, an opposed screw and a body therebetween for use in securing a load to a flange of an a beam;
   a plate including a first portion having a locking texture on at least one side of the plate and a second portion off-set from the first portion having a mounting hole therethrough, the mounting hole receiving the body of the C-type clamp with a clearance fit and the locking texture being aligned with the anvil of the C-type clamp and the first portion being juxtaposed with the anvil with the mounting hole receiving the C-type clamp body.

2. The clamp assembly of claim 1, the locking texture being stipple extending from the plate away from the anvil with the mounting hole receiving the C-type clamp body.

3. The clamp assembly of claim 1, the locking texture being formed teeth on at least one side of the plate.

4. The clamp assembly of claim 1, the locking texture being ribs extending to either side of the plate.

5. The clamp assembly of claim 1, the plate being of harder material than the C-type clamp.

6. The clamp assembly of claim 1 further comprising
   a threaded rod, the body of the C-type clamp body having threads to receive the threaded rod with the rod depending therefrom.

7. A clamp assembly comprising
   a C-type clamp having an anvil, a screw opposed to the anvil and a body integral with the anvil and threadably receiving the opposed screw;
   a plate including a first portion having a locking texture on at least one side of the plate and a second portion off-set from the first portion having a mounting hole therethrough, the mounting hole receiving the body of the C-type clamp with a clearance fit, the locking texture being aligned with the anvil of the C-type clamp and the first portion being juxtaposed with the anvil with the mounting hole receiving the C-type clamp body.

8. The clamp assembly of claim 7, the locking texture extending from the plate away from the anvil with the mounting hole receiving the C-type clamp body.

9. The clamp assembly of claim 7, the locking texture being on both sides of the plate.

10. The clamp assembly of claim 7, the plate being of harder material than the C-type clamp.

11. The clamp assembly of claim 7 further comprising
    a threaded rod, the body of the C-type clamp body having threads to receive the threaded rod with the rod depending therefrom.

* * * * *